(12) United States Patent
Chun

(10) Patent No.: US 9,815,085 B2
(45) Date of Patent: Nov. 14, 2017

(54) HAPTIC ACTUATOR

(71) Applicant: HYSONIC. CO., LTD., Ansan-si (KR)

(72) Inventor: Se Jun Chun, Ansan-si (KR)

(73) Assignee: HYSONIC. CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/779,659

(22) PCT Filed: Jul. 18, 2014

(86) PCT No.: PCT/KR2014/006560
§ 371 (c)(1),
(2) Date: Sep. 24, 2015

(87) PCT Pub. No.: WO2016/010180
PCT Pub. Date: Jan. 21, 2016

(65) Prior Publication Data
US 2017/0120297 A1    May 4, 2017

(51) Int. Cl.
*H02K 33/00* (2006.01)
*H02K 7/10* (2006.01)
*B06B 1/04* (2006.01)
*G06F 3/01* (2006.01)

(52) U.S. Cl.
CPC .............. *B06B 1/045* (2013.01); *G06F 3/016* (2013.01)

(58) Field of Classification Search
CPC ................................ H02K 33/00; B06B 1/045
USPC .............................. 310/15, 25, 36, 51, 80, 81
See application file for complete search history.

(56) References Cited

U.S. PATENT DOCUMENTS

| | | | | |
|---|---|---|---|---|
| 2011/0018364 A1* | 1/2011 | Kim | ........................ | H02K 33/18 310/17 |
| 2011/0018365 A1* | 1/2011 | Kim | ........................ | B06B 1/045 310/17 |
| 2011/0266892 A1* | 11/2011 | Wauke | .................... | B06B 1/045 310/25 |
| 2012/0104875 A1* | 5/2012 | Park | ........................ | H02K 33/16 310/25 |
| 2012/0112565 A1* | 5/2012 | Lee | ........................ | H02K 33/16 310/20 |
| 2012/0169151 A1* | 7/2012 | Dong | .................... | H02K 33/16 310/25 |

(Continued)

FOREIGN PATENT DOCUMENTS

| | | |
|---|---|---|
| KR | 101055562 | 8/2011 |
| KR | 101250288 | 4/2013 |

*Primary Examiner* — Jose Gonzalez Quinones
(74) *Attorney, Agent, or Firm* — Cantor Colburn LLP

(57) ABSTRACT

A haptic actuator having a vibrating body which comprises a first magnetic body disposed on one end of the coil member in the vertical direction; a second magnetic body disposed on an opposite end of the coil member in the vertical direction; a first magnet and a second magnet mounted on both ends of the first magnetic body in the horizontal direction respectively; a third magnet and a forth magnet mounted on both ends of the second magnetic body in the horizontal direction respectively; a third magnetic body mounted on one ends of the first magnet and the third magnet in the horizontal direction; a forth magnetic body mounted on the opposite ends of the second magnet and the forth magnet in the horizontal direction; and a first weight and the second weight mounted on the third magnetic body and the forth magnetic body respectively.

8 Claims, 7 Drawing Sheets

(56) References Cited

U.S. PATENT DOCUMENTS

2014/0077628 A1* 3/2014 Yamada ................. H02K 33/16
                                                    310/12.16
2014/0152126 A1* 6/2014 Kim ....................... B06B 1/045
                                                    310/25

* cited by examiner (a)

(b)

(c)

HAPTIC ACTUATOR

TECHNICAL FIELD

The present invention relates to a haptic actuator, and more particularly, to a haptic actuator being installed in an electronic device such as portable terminal etc. which needs vibration response by touch and generating vibration by interaction between a coil and a magnet.

BACKGROUND ART

Generally bell sound and vibration are well used for the receipt of communication device. For the vibration, it is a general case that a whole device is able to vibrate by actuating a small vibration generation device and subsequently transferring a actuating force to a case of the device.

Currently, the vibration generation device which is one of the receipt means applied in the communication device such as a cell phone is a component converting electric energy into mechanical vibration by using the generating principle of electromagnetic force and the vibration generation device is installed in a cell phone and is used for silent notice of the receipt.

The vibration generation device is widely used for the purpose of the notice of receipt of the cell phone or the like, and recently the use of vibration generation device is increased as follows, the vibration generation device is installed in a game device in order to inform user thereof of the game progress conditions or the vibration generation device is installed in a touch phone or the like in order for user thereof to know feeling that keys thereof were touched.

The need for product development of a new structure is rising which the drawback of the existing product of the vibration generation device is avoided and its quality is dramatically improved in the state expecting miniaturization and high qualification of the cell phone component following the trend that the cell phone market has been quickly expanded and moreover multi-functions are added to the cell phone.

The vibration generation device of the prior art mounted on the portable terminal as a vibration generation device basically using the secondary vibration system attaches a weight to an elastic body such as a spring and has a coil to vibrate the weight.

The weight vibrates depending on the frequency response characteristics predetermined by the weight and a modulus of elasticity of the elastic body when current is applied to the coil.

As described above, recently the portable terminal launched has a function providing feedback to user which corresponds to input, by outputting voice or vibration response to the user's touch input.

Particularly, in case of the portable terminal applied a haptic technology, the research of the vibration generation device generating the various types of vibrations in order to provide a various of haptic feedback in response to user's various input is underway.

The vibration generation device of the prior art, however, generates a vertical actuating power of the weight using Lorentz force between a coil and a fixed magnet, wherein it is difficult to get good characteristics in vibration strength and vibration frequency band, etc. because of limitation of a structure of the vibration generation device by means of Lorentz force.

Particularly, in the vibration generation device of LRA (Linear Resonant Actuator) method or Linear Motor of the prior art, there was a problem that the response speed is not fast because there is a limit to the increase in damping value.

PRIOR ART DOCUMENTS

1. Korean patent no. 10-1250288
2. Korean patent no. 10-1055562

DISCLOSURE

Technical Problem

The present invention has been made in an effort to solve the above-described problems, and it is an object of the present invention to provide a haptic actuator having more improved performance in response speed, frequency band or the like according to touch of user by improving magnetic force structure.

Technical Solution

In order to achieve the object, an haptic actuator of the present invention having a case formed an accommodation space inside thereof; a coil member fixed to the case, wound on the case in the vertical direction, and connected to a control member to be supplied power from the control member; and a vibrating body disposed on the outside of the coil member and elastically and movably mounted on the accommodation space in the horizontal direction, Wherein the vibrating body comprises a first magnetic body disposed on one end of the coil member in the vertical direction; a second magnetic body disposed on an opposite end of the coil member in the vertical direction; a first magnet and a second magnet mounted on both ends of the first magnetic body in the horizontal direction respectively; a third magnet and a forth magnet mounted on both ends of the second magnetic body in the horizontal direction respectively; a third magnetic body mounted on one ends of the first magnet and the third magnet in the horizontal direction; a forth magnetic body mounted on the opposite ends of the second magnet and the forth magnet in the horizontal direction; and a first weight and the second weight mounted on the third magnetic body and the forth magnetic body respectively.

The polarities of the first magnet and the third magnet is disposed to be symmetrical to the polarities of the second magnet and the fourth magnet around the coil member.

The first magnetic body and the second magnetic body are made of a ferromagnetic metal or a magnet and the polarity toward the coil member of them and polarity toward the coil member of the first magnet is formed in a same manner.

The third magnetic body is made as one body and the both ends thereof in the vertical direction contact with the first magnet and the third magnet respectively, the forth magnetic body is made as one body and the both ends thereof in the vertical direction contact with the second magnet and the forth magnet respectively.

The upper ends and the lower ends of the third magnetic body and the forth magnetic body form a magnetic enhancing grooves concaving in the center directions thereof respectively.

The third magnetic body is separated into 2 parts and the 2 parts is spaced apart from the first magnet and the third magnet respectively, the forth magnetic body is separated into 2 parts and the 2 parts is spaced apart from the second magnet and the forth magnet respectively.

Between the both ends of the vibrating body in the horizontal direction and the case, a first elastic member and a second elastic member elastically supporting the vibrating body in the horizontal direction is mounted respectively, wherein the first elastic member and the second elastic member is formed with a leaf spring bended as a wave shape.

The vibrating body has a penetrating hole which the coil member is inserted, and further comprises a supporting plate having a seating area disposed the first magnetic body, the first magnet, the second magnet, the second magnetic body, the third magnet, the forth magnet, the third magnetic body, the forth magnetic body, the first weight, and the second weight therein, the first elastic member and the second member is mounted between the case and the both ends of the supporting plate in the horizontal direction respectively and elastically support the supporting plate to be movable in the horizontal direction.

A third elastic member and a forth elastic member is provided in the both ends of the coil member in the horizontal direction, the elastic member and a forth elastic member increase the acceleration of the vibrating body by repulsive force at the time of collision with the vibrating body.

Advantageous Effects

A haptic actuator of the present invention as described above has an effect as follows:

The vibrating body 300 becomes a negative stiffness state by magnetic property with the structure of magnetic force lines, the force which is going to be disposed at the center of the coil member 200 is generated on the vibrating body 300, thereby the damping value of the vibrating body 300 is increased, and the response speed of the vibrating body 300 according to the signal of the control member is faster.

Further, when the response speed of the vibrating body 300 is faster, the quality and performance is improved since the response corresponding to touch of portable terminal to which the haptic actuator is applied is quickly transferred to user.

The magnetic enhancing grooves 323a, 324a is formed in the third magnetic body 323 and the fourth magnetic body 324, thereby the strength of magnetic force is strengthened and the actuating force of the vibrating body 300 is improved when the third magnetic body 323 and the fourth magnetic body 324 is magnetized.

the third elastic member 510 and the fourth elastic member 520 is mounted on both ends of the coil member 200, thereby the acceleration of the vibrating body 300 is increased, because of this the response speed of the haptic actuator is more faster.

DESCRIPTION OF DRAWINGS

The above and other objects, features and advantages of the present invention will become apparent from the following description of preferred embodiments given in conjunction with the accompanying drawings, in which.

BEST MODE

Figure 1:
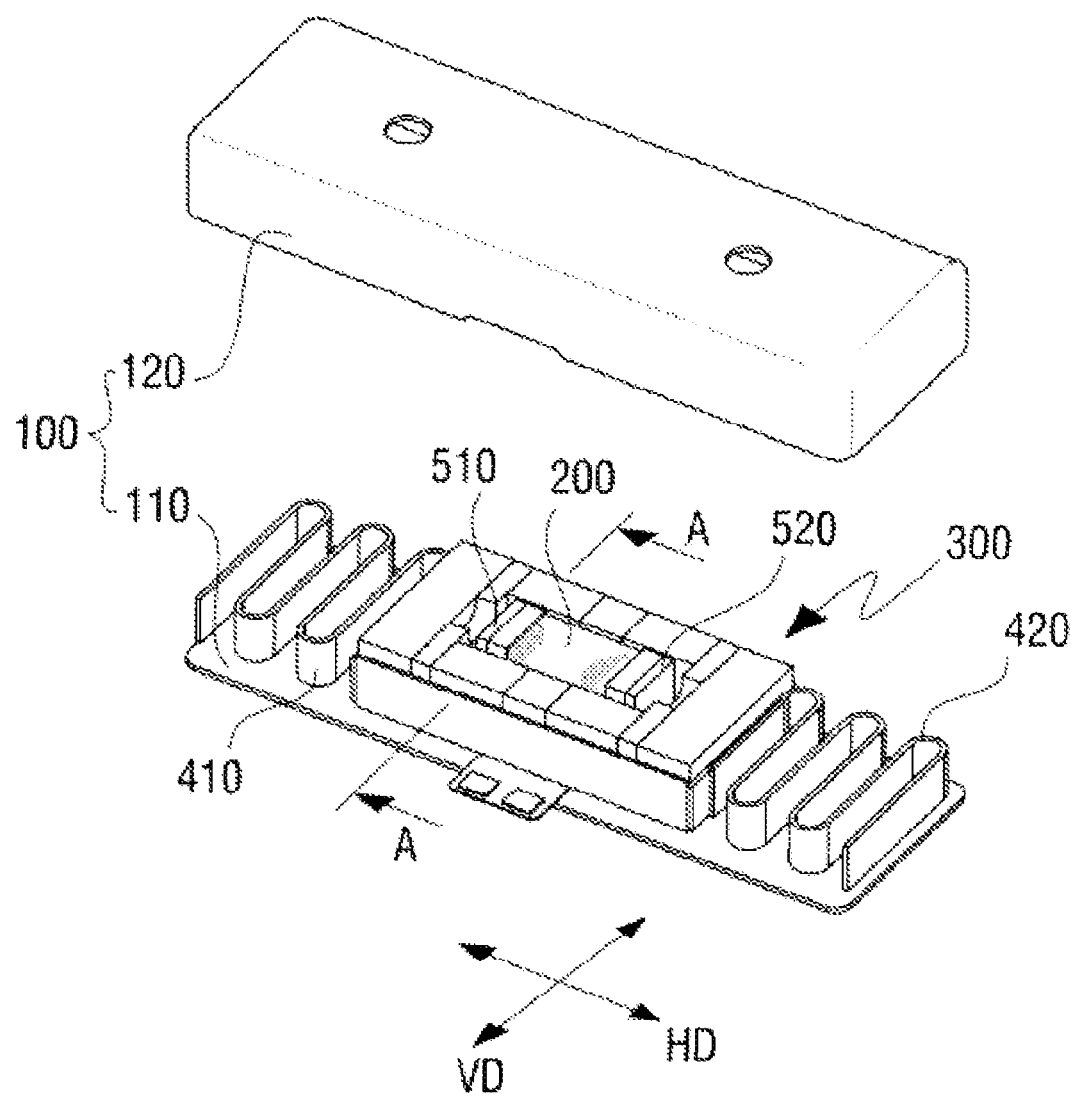
FIG. 1 is a perspective view illustrating a haptic actuator according to an embodiment of the present invention.
Figure 2:
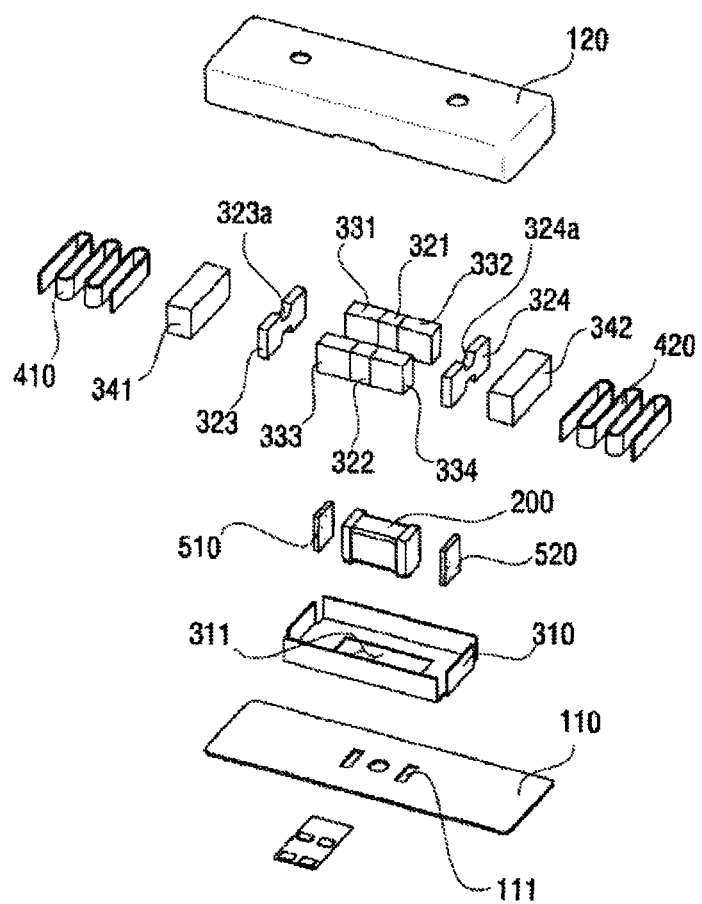
FIG. 2 is an exploded perspective view illustrating a haptic actuator according to an embodiment of the present invention.
Figure 3:
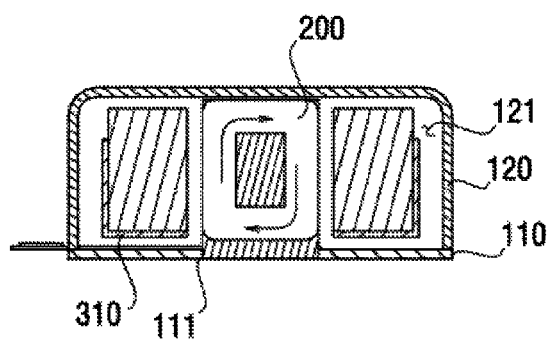
FIG. 3 is a sectional view taken along a line A-A in FIG. 1.
Figure 4:
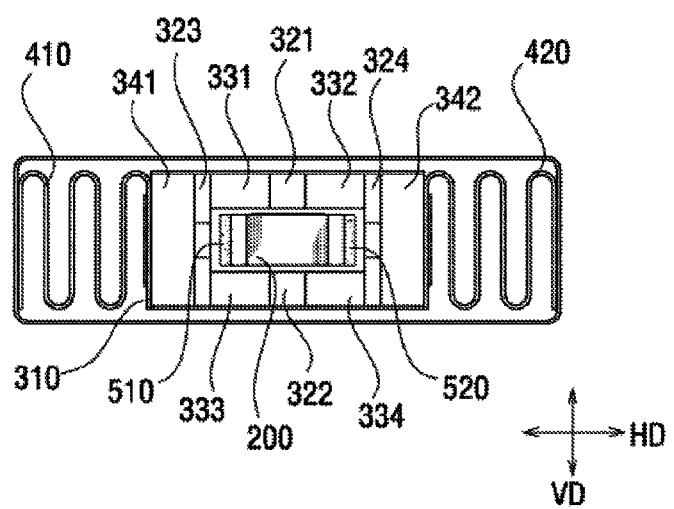
FIG. 4 is a plan view illustrating a structure of a haptic actuator according to an embodiment of the present invention.
Figure 5:
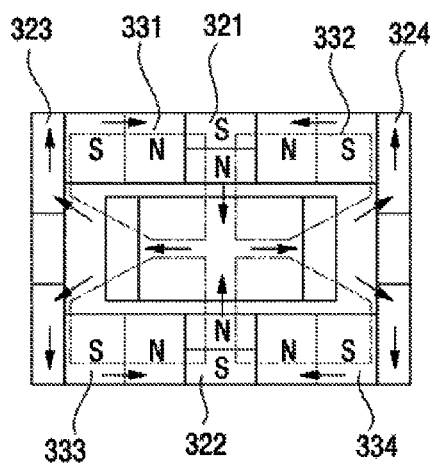
FIG. 5 is a view illustrating a magnetic structure of the vibrating body according to an embodiment of the present invention.
Figure 6:
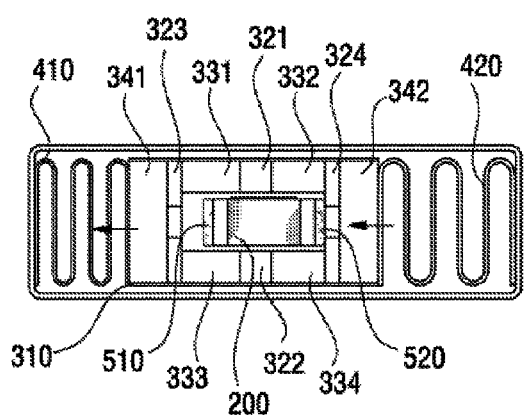
FIG. 6 is a view illustrating operating condition according to an embodiment of the present invention.
Figure 7:
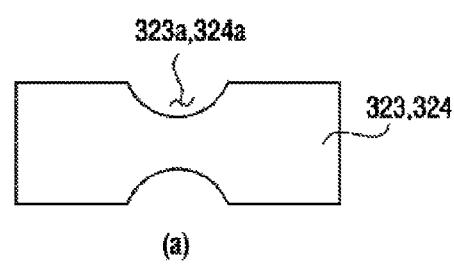
FIG. 7 is a plan view illustrating a structure of a third magnetic body and a fourth magnetic body according to an embodiment of the present invention.
Figure 7:
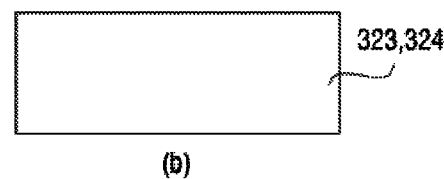
Figure 7:
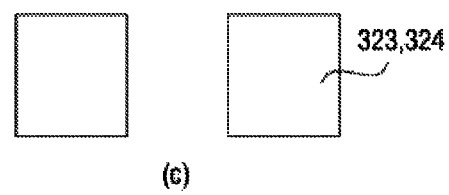
Figure 8:
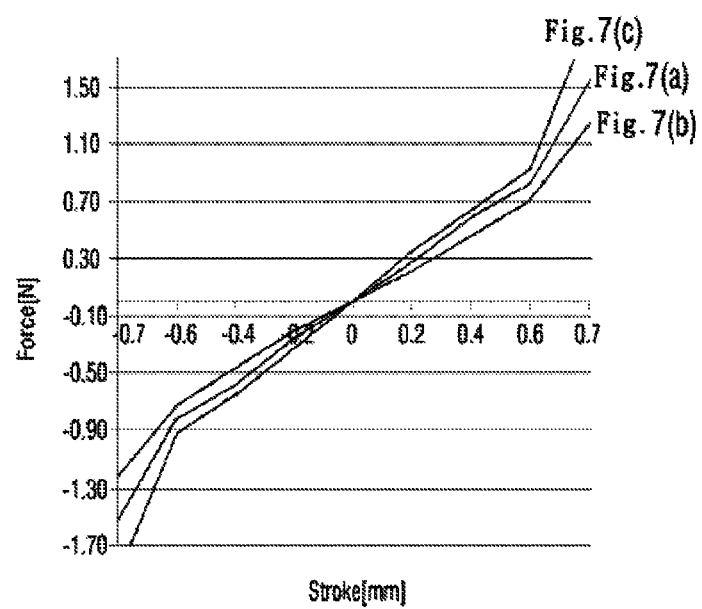
FIG. 8 is a graph illustrating the change of force according to the shapes of the third magnetic body and the forth magnetic body shown in FIG. 7.
Figure 9:
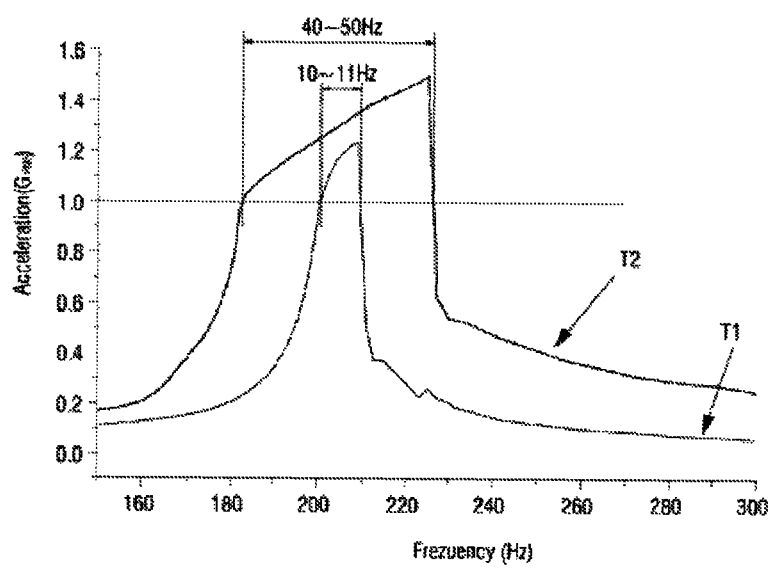
FIG. 9 is data comparing the performance of a haptic actuator according an embodiment of the present invention with that of vibrating motor according to the prior art.

FIG. 1 is a perspective view illustrating a haptic actuator according to an embodiment of the present invention, FIG. 2 is an exploded perspective view illustrating a haptic actuator according to an embodiment of the present invention, FIG. 3 is a sectional view taken along a line A-A in FIG. 1, FIG. 4 is a plan view illustrating a structure of a haptic actuator according to an embodiment of the present invention, FIG. 5 is a view illustrating a magnetic structure of the vibrating body according to an embodiment of the present invention. FIG. 6 is a view illustrating operating condition according to an embodiment of the present invention. FIG. 7 is a plan view illustrating a structure of a third magnetic body and a fourth magnetic body according to an embodiment of the present invention. FIG. 8 is a graph illustrating the change of force according to the shapes of the third magnetic body and the forth magnetic body shown in FIG. 7, and FIG. 9 is data comparing the performance of a haptic actuator according an embodiment of the present invention with that of vibrating motor according to the prior art.

As illustrated in FIGS. 1 to 7, a haptic actuator according to an embodiment of the present invention includes a case 100, a coil member 200, a vibrating body 300, a first elastic member 410, a second elastic member 420, a third elastic member 510 and a forth elastic member 520.

The case 100 has a substantially rectangular shape which is long in the horizontal direction (HD) i.e. in the right and left direction, is a non-magnetic body, and specifically comprises a bottom plate 110 and a cover 120.

The bottom plate 110 has a rectangular plate shape which is long in the approximately horizontal direction (HD) and has a fixing groove 111 in the center portion thereof in which a coil member 200 as will be described later is fixed.

The cover 120, as described in FIG. 3, surrounds the bottom plate 110 so that an accommodation space 121 is formed therein wherein the accommodation space 121 is a space in which the coil member 200 and the vibrating body 300 is received therein.

The coil member 200 is formed by wrapping wire around a bobbin in the vertical direction (VD) which is formed to be long in the horizontal direction (HD), i.e. in the left and right direction and the coil member 200 is fixed to the bottom plate 110.

In other words, the coil member 200 is fabricated by wrapping wire around bobbin in the vertical direction (HD), and as shown in FIG. 3, the low end of the bobbin is inserted in the fixing groove 111.

Naturally, the coil member 200 may be fixed to the bottom plate 110 by applying adhesive.

The coil member 200 as such is connected with a control member of a portable terminal or the like and is supplied power from the control member.

Meanwhile, the vibrating body 300 is arranged at the outside of the coil member 200 of an accommodation space 121.

Specifically, the vibrating body 300 includes a supporting plate 310, a first magnetic body 321, a second magnetic body 322, a first magnet 331, a second magnet 332, a third magnet 333, a fourth magnet 334, a third magnetic body 323, a fourth magnetic body 324, a first weight 341 and a second weight 342.

The supporting plate 310, as shown in FIG. 2, has a hexahedron shape of which the upper end is opened, and has a seating area therein in which a first magnetic body 321, a second magnetic body 322, a first magnet 331, a second magnet 332, a third magnet 333, a fourth magnet 334, a third magnetic body 323, a fourth magnetic body 324, a first weight 341 and a second weight 342 are mounted.

On the both sides of the supporting plate 310 in the horizontal direction (HD), the first elastic member 410 and the second elastic member 420 as will be described later is mounted and the supporting plate 310 is mounted in the accommodation space 121 of the case 100 to be movable in left and right direction by the first elastic member 410 and the second elastic member 420.

Further, the through hole 311 having a rectangular shape in which the coil member 200 is inserted is formed in the center portion of the low end of the supporting plate 310.

The size of the through hole 311 is greater than that of the coil member 200, because of this, the supporting plate 310 does not interfere with the coil member 200 when the supporting plate 310 is moved in the left and right direction.

The first magnetic body 321 has a hexahedron shape, is fixed at the supporting plate 310, and is disposed on one end of the coil member 200 in the vertical direction (VD), i.e., as shown in FIG. 4, is disposed slightly apart from the coil member 200 in the center of the upper portion of the coil member 200.

The first magnetic body 321 is made of a ferromagnetic material, and specifically of SPCC material, and in some case, of a magnet having a polarity.

In this case, when the first magnetic body 321 is made of a magnet, the polarity of the direction of the coil member 200 of the first magnetic body 321 is equally arranged with the polarity of the first magnetic body 321 of the first magnet 331 and the second magnet 332 as will be described later.

In other words, as shown in FIG. 5, the North poles of the first magnet 331 and the second magnet 332 is disposed in the direction of the first magnetic body 321 and the North pole of the first magnetic body 321 is disposed in the direction of the coil member 200 and the South pole of the first magnetic body 321 is disposed in the direction opposite the direction of the coil member 200.

The first magnetic body 321 according to an embodiment of the present invention is made of a ferromagnetic material, and is magnetized by the first magnet 331 and the second magnet 332 as will be described later, and as shown in FIG. 5, the North pole of the first magnetic body 321 is formed in the direction of the coil member 200 and the South pole of the first magnetic body 321 is formed in the direction opposite the direction of the coil member 200.

The second magnetic body 322 is made of SPCC material in the same manner as the first magnetic body 321 and is disposed on the opposite end in the vertical direction (VD) of the coil member 200, i.e. disposed on slightly apart from center of the lower portion of the coil member 200 as shown in FIG. 4, and is fixed at the supporting plate 310.

The second magnetic body 322 is magnetized by the third magnet 333 and the forth magnet 334 as will be described later, and the polarity of the second magnetic body is formed to be symmetrical to the polarity of the first magnetic body 321 around the coil member 200.

In other words, as shown in FIG. 5, the North pole of the second magnetic body is formed in the direction of the coil member 200 and the South pole of the second magnetic body is formed in the direction opposite the direction of the coil member 200.

The first magnet 331 and the second magnet 332 have a hexahedral shape of which horizontal length is longer than that of the first magnetic body 321, is fixed at the supporting plate 310 and is mounted on the both ends of the magnetic body 321 in the horizontal direction (HD).

In other words, as shown in FIG. 4, the first magnet 331 is disposed on the left side of the first magnetic body 321, and the second magnet 332 is disposed on the right side of the first magnet body 321.

Further, regarding to the polarity of the first magnet 331 and the second magnet 332, as shown in FIG. 5, the North pole of the first magnet 331 and the second magnet 332 is disposed in the direction of the first magnetic body 321, and the South pole of the first magnet 331 and the second magnet 332 is disposed in the direction opposite the direction of the first magnetic body 321.

In other words, the polarity of first magnet 331 and the second magnet 332 is disposed to be mutually symmetrical around the first magnetic body 321.

The third magnet 333 and the second magnet 332 are formed in the same manner as the first magnet 331, are fixed to the supporting plate 310, and are mounted on the both ends of the second magnetic body 322 in the horizontal direction (HD) respectively.

In other words, as shown in FIG. 4, the third magnet 333 is disposed on the left side of the second magnetic body 322 and the fourth magnet 334 is disposed on the right side of the second magnetic body 322.

Further, regarding to the polarity of the third magnet 333 and the fourth magnet 334, as shown in FIG. 5, the North pole of the third magnet 333 and the fourth magnet 334 is disposed in the direction of the second magnetic body 322, and the South pole of the third magnet 333 and the fourth magnet 334 is disposed in the direction opposite the direction of the second magnetic body 322.

In other words, the polarity of third magnet 333 and the fourth magnet 334 is disposed to be mutually symmetrical around the second magnetic body 322.

If, regarding to the polarity of the first magnet 331 and the second magnet 332, the North pole of the first magnet 331 and the second magnet 332 is disposed in the direction of the first magnetic body 321 and the South pole of the first magnet 331 and the second magnet 332 is disposed in the direction opposite the direction of the first magnetic body 321, then the North pole of the third magnet 333 and the fourth magnet 334 has to be also disposed in the direction of the second magnetic body 322 and the South pole of the third magnet 333 and the fourth magnet 334 has to be also disposed in the direction opposite the direction of the second magnetic body 322, wherein regarding to the polarity of the first magnetic body 321 and the second magnetic body 322, the North pole of the first magnetic body 321 and the second magnetic body 322 is disposed in the direction of the coil member 200 and the South pole of the first magnetic body 321 and the second magnetic body 322 is disposed in the direction opposite the direction of the coil member 200.

Meanwhile, the third magnetic body 323 is made of SPCC material in the same manner as the first magnetic body 321, i.e. ferromagnetic material and has a vertically long rectangular shape, is disposed on one end in the horizontal direction (HD) of the coil member 200, on which the first magnet 331 and the third magnet 333 is disposed i.e. as shown in FIG. 4, is disposed on the left side of the first magnet 331 and the third magnet 333, and is fixed to the fixing plate 310.

In other words, the third magnetic body 323 is made as one body, and the both ends of the third magnetic body in the vertical direction (VD) contact with the first magnet 331 and the third magnet 333 respectively.

Further, as shown in FIG. 2 and (a) of FIG. 7, a magnetic force enhancing groove 323a having a semicircular shape is formed in the outside of the third magnetic body 323.

The magnetic force enhancing groove 323a is formed on a upper end and a lower end of the third magnetic body 323 respectively and is concaved toward center direction of the third magnetic body 323.

When the third magnetic body 323 is magnetized, the magnetic force enhancing groove 323a enhances the strength of the magnetic force, thereby improving the driving force of the actuating body 300.

Naturally, in some cases, as shown in FIG. 7b, the third magnetic body 323 is made as one rectangular body without the magnetic force enhancing groove 323a, is separated into two parts in the vertical direction (VD) as shown in (c) of FIG. 7, and is mounted to be contacted with the first magnet 331 and the second magnet 332 in a state spaced apart each other in the vertical direction (VD) respectively.

However, as shown in FIG. 8, when the magnetic force enhancing groove 323a is formed in the third magnetic body 323, the force depending on displacement distance of the vibrating body 300 is higher.

Specifically, FIG. 8 is a view illustrating the measurement of change of the magnetic force[N] of the vibrating body 300 depending on the displacement distance[mm] of the vibrating body 300, when power is applied to the coil member 200, wherein use of the type shown in (a) of FIG. 7 which is formed the magnetic force enhanced groove 323a is a more preferable embodiment than use of the type shown in (b) of FIG. 7.

Naturally, the force of type shown in (c) of FIG. 7 is greater than the force of type shown in (a) of FIG. 7, but the type shown in (c) of FIG. 7 has a poor assembling property and increases costs since it is separated into two parts, accordingly use of the type shown in (a) of FIG. 7 which is formed the magnetic force enhancing groove 323a is the more preferable embodiment.

Meanwhile, the fourth magnetic body 324 is made of SPCC material in the same manner as the third magnetic body 323, has a hexahedral shape which is long in the vertical direction (VD), is disposed on the other end in horizontal direction (HD) of coil member 200 on which the second ma net 332 and the fourth magnet 334 is disposed, i.e., as shown in FIG. 4, is disposed in the right side of the second magnet 332 and the fourth magnet 334, and is fixed to the supporting plate 310.

Further, the magnetic force enhancing groove 324a described above is formed in the upper end as well as the lower end of the fourth magnetic body 324, the detailed description of the magnetic force enhanced groove is omitted since its effects and functions is the same as that described above.

The vibrating body 300 having the configuration described above generates magnetic field lines of four closed-loop structures by means of magnetism, as the direction of the arrow shown in FIG. 5.

The vibrating body 300 becomes the state of negative stiffness at the time of vibration because of the structure of magnetic field lines as described above and structure of the first elastic member 410 and the second elastic member 420 as will be described later.

In other words, when power is applied to the coil member 200, the vibrating body becomes a steady state in the predetermined range of the displacement distance (mm) which the vibrating body 300 moves in left and right direction, wherein the steady state is a state that the difference between the magnetic force (N) being generated in the vibrating body 300 and the elastic force of the first elastic member 410 and the second elastic member 420 is less than +/−1.

Further, the force to be disposed in the center of the coil member 200 is generated in the vibrating body 300 by magnetic field structure of the vibrating body 300.

As such, if the vibrating body 30 becomes the state of negative stiffness, then the damping value of the vibrating body 300 increases, because of this, the response speed of the vibrating body depending on signal of the control member is faster.

In this case, as a result of measurement of the response speed of a haptic actuator of the present invention and a vibrating motor of the prior art, while the response speed of the vibrating motor of the prior art is about 27.5 ms, the response speed of the haptic actuator according to an embodiment of the present invention is about 5.5 ms.

Further, as described in FIG. 9, the acceleration of the haptic actuator T2 according to a embodiment of the present invention is greater than that of the vibrating motor T1 of the prior art, and the response frequency range of the haptic actuator T2 is wider than that of the vibrating motor T1.

Specifically, FIG. 9 is a graph comparing and measuring acceleration of the haptic actuator T2 of the present invention and the vibration motor of the prior art according to the frequency of the power applied to the coil members, when based on 1G, in the case of the haptic actuator T2 of the present invention, the range of the response frequency is about 40 to 50 Hz, whereas in the case of the vibration motor T1 of the prior art, the range of the response frequency is about 20 Hz Further, while the maximum acceleration of the vibrating motor T1 of the prior art is 1.2 G, the maximum acceleration of the haptic actuator T2 according to a embodiment of the present invention is about 1.5 G.

As such, by the structure of the magnetic field of the vibrating body 300 according to an embodiment of the present invention, a performance in frequency band or the like of the haptic actuator according to an embodiment of the present invention is much more improved than that of the vibrating motor of the prior art, particularly, the response speed of the haptic actuator is faster than that of the vibrating motor.

Further, if the response speed of the haptic actuator is faster than that of the vibrating motor, for the portable terminal to which the haptic actuator is applied, the output according to the various pattern of input signs is quickly generated and delivered, thereby the quality and performance of the haptic actuator may be improved.

Meanwhile, the first weight 341, as shown in FIG. 2 and FIG. 4, has a hexahedron shape, material thereof is tungsten, the first weight is arranged in the right side of the third magnetic body 323 and is fixedly mounted to the support plate 310.

The second weight 342 has the same shape as that of the first weight 341, is arranged on the left side of the forth magnetic body 324 and is fixedly mounted on the supporting plate 310.

the first weight 341 and the second weight 342 enable the vibrating body 300 to have the same resonance frequency as the frequency of power applied to the coil member 200 and influence to acceleration thereof, when the current is applied to the coil member 200, the first weight and the second weight translate horizontally by the interaction between the magnetic force lines generated around the coil member 200 and the magnetic force lines generated on the vibrating body 300, thereby vibration is generated.

The first elastic member 410 and the second elastic member 420 is mounted between both ends of the vibrating body 300 in the horizontal direction (HD) and the case 100.

Specifically, the first elastic member 410 is formed with a leaf spring which has a wave shape in the vertical direction (VD), the both ends of the first elastic member are fixed on the left side of the supporting plate 310 and the cover 120 respectively.

The second elastic member 420 is formed with a leaf spring which has a wave shape in the vertical direction (VD) like the first elastic member 410, the both ends of the first elastic member are fixed on the right side of the supporting plate 310 and the cover 120 respectively.

The first elastic member 410 and the second elastic member 420 support the vibrating body 300 in the horizontal direction (HD), i.e. in the left and right directions and thereby facilitating the translation of the vibrating body 300 in the left and right directions.

Further, the first elastic member 410 and the second elastic member 420 are formed with a leaf spring which has a wave shape in the vertical direction (VD), thereby preventing the vibrating body 300 form drooping toward the bottom plate 120.

Meanwhile, the third elastic member 510 and the forth elastic member 520 has a hexahedron shape and are mounted on an both ends of the coil member 200 in the vertical direction (VD) respectively and are made of an elastic rubber material.

When the vibrating body 300 translates in the vertical direction (VD), the third elastic member 510 and the forth elastic member 520 generate the repulsive force by a collision with the vibrating body 300 and thereby the acceleration of the vibrating body 300 is increased.

Moreover, the first elastic member 510 and the fourth elastic member 520 play a role as an absorbing-sound member which decreases a generation of noise when colliding with the vibrating body 300.

As such, the second elastic member 510 and the forth elastic member 520 are mounted on the both sides of the coil member 200 respectively, thereby the acceleration of the vibrating body 300 is increased, because of this, the response speed of the haptic actuator is more increased and the generation of the noise is decreased.

If the power which has an predetermined frequency is applied to the coil member 200 via a control member, the haptic actuator according an embodiment of the present invention as described above, as shown in FIG. 6, enables the vibrating body 300 to be translated in the left or right direction, and the first weight 341 and the second weight 342 are oscillated, thereby vibration is generated.

In this case, the magnetic force lines of four closed loops structures formed by the placement of magnetic polarity is formed in the vibrating body 300, and by the correlation between the first elastic member 410 and the second elastic member 420, at the time of vibration, the vibrating body 300 becomes a negative stiffness state, thereby the damping value of the vibrating body 300 is increased and the response speed of the haptic actuator according to the signal of the control member is faster than prior art.

INDUSTRIAL APPLICABILITY

While the present invention has been described with respect to the specific embodiments, it will be apparent to those skilled in the art that various changes and modifications may be made without departing from the spirit and scope of the invention as defined in the following claims.

The invention claimed is:

1. A haptic actuator having a case formed an accommodation space inside thereof; a coil member fixed to the case, wound on the case in the vertical direction, and connected to a control member to be supplied power from the control member; and a vibrating body disposed on the outside of the coil member and elastically and movably mounted on the accommodation space in the horizontal direction, wherein the vibrating body comprising:
a first magnetic body disposed on one end of the coil member in the vertical direction;
a second magnetic body disposed on an opposite end of the coil member in the vertical direction;
a first magnet and a second magnet mounted on both ends of the first magnetic body in the horizontal direction respectively;
a third magnet and a forth magnet mounted on both ends of the second magnetic body in the horizontal direction respectively;
a third magnetic body mounted on one ends of the first magnet and the third magnet in the horizontal direction;
a forth magnetic body mounted on the opposite ends of the second magnet and the forth magnet in the horizontal direction; and
a first weight and the second weight mounted on the third magnetic body and the forth magnetic body respectively,
wherein, the polarities of the first magnet and the second magnet have a north polar in the direction of the first magnetic body and a south polar in the opposite direction thereof, the polarities of the third magnet and the forth magnet have a north polar in the direction of the second magnetic body and a south polar in the opposite direction thereof, and the polarities of the first magnetic body and second magnetic body have a north polar in the direction of the coil member and a south polar in the opposite direction thereof.

2. The haptic actuator of claim 1,
wherein the first magnetic body and the second magnetic body are made of a ferromagnetic metal or a magnet.

3. The haptic actuator of claim 1,
Wherein the third magnetic body is made as one body and the both ends thereof in the vertical direction contact with the first magnet and the third magnet respectively, wherein the forth magnetic body is made as one body and the both ends thereof in the vertical direction contact with the second magnet and the forth magnet respectively.

4. The haptic actuator of claim 3,
The upper ends and the lower ends of the third magnetic body and the forth magnetic body form a magnetic enhancing grooves concaving in the center directions thereof respectively.

5. The haptic actuator of claim 1,
wherein the third magnetic body is separated into 2 parts and the 2 parts is spaced apart from the first magnet and the third magnet respectively,
wherein the forth magnetic body is separated into 2 parts and the 2 parts is spaced apart from the second magnet and the forth magnet respectively.

6. The haptic actuator of claim 1,
wherein, between the both ends of the vibrating body in the horizontal direction and the case, a first elastic member and a second elastic member elastically supporting the vibrating body in the horizontal direction is mounted respectively,
wherein the first elastic member and the second elastic member is formed with a leaf spring bended as a wave shape.

7. The haptic actuator of claim 6,
wherein the vibrating body has a penetrating hole which the coil member is inserted, and further comprising:
a supporting plate having a seating area disposed the first magnetic body, the first magnet, the second magnet, the second magnetic body, the third magnet, the forth magnet, the third magnetic body, the forth magnetic body, the first weight, and the second weight therein,
wherein the first elastic member and the second member is mounted between the case and the both ends of the supporting plate in the horizontal direction respectively and elastically support the supporting plate to be movable in the horizontal direction.

8. The haptic actuator of claim 1,
wherein a third elastic member and a forth elastic member is provided in the both ends of the coil member in the horizontal direction, wherein the elastic member and a forth elastic member increase the acceleration of the vibrating body by repulsive force at the time of collision with the vibrating body.

* * * * *